United States Patent
Fallis et al.

(10) Patent No.: US 7,341,113 B2
(45) Date of Patent: Mar. 11, 2008

(54) APPARATUS AND METHOD FOR FIRE SUPPRESSION

(75) Inventors: Stephen Fallis, Ridgecrest, CA (US); Joseph A. Manchor, Ridgecrest, CA (US); Gary W Meyers, Ridgecrest, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 118 days.

(21) Appl. No.: 11/489,807

(22) Filed: Jul. 13, 2006

(65) Prior Publication Data

US 2008/0017392 A1    Jan. 24, 2008

Related U.S. Application Data

(63) Continuation-in-part of application No. 10/774,660, filed on Feb. 3, 2004, now abandoned.

(51) Int. Cl.
*A62C 2/00* (2006.01)
(52) U.S. Cl. .................... 169/46; 169/28; 169/45; 169/48; 169/54; 169/58; 169/62; 169/70; 52/2.22; 428/117; 428/920
(58) Field of Classification Search ............ 169/26, 169/28, 45, 46, 48, 49, 54, 56, 58, 62, 70; 428/73, 116, 117, 920, 921
See application file for complete search history.

(56) References Cited

U.S. PATENT DOCUMENTS

| | | | | |
|---|---|---|---|---|
| 3,336,153 A | * | 8/1967 | Walter | 428/920 |
| 3,833,063 A | * | 9/1974 | Williams | 169/28 |
| 4,251,579 A | * | 2/1981 | Lee et al. | 428/73 |
| 4,938,293 A | * | 7/1990 | Warren et al. | 169/28 |
| 5,518,075 A | * | 5/1996 | Williams | 169/28 |
| 5,762,145 A | * | 6/1998 | Bennett | 169/62 |
| 6,521,362 B2 | * | 2/2003 | Koeppen | 169/46 |
| 6,657,059 B2 | | 12/2003 | Hiskey et al. | |
| 6,983,805 B2 | * | 1/2006 | Chattaway | 169/48 |

OTHER PUBLICATIONS

David Chavez et.al., Tetrazine Explosives—Propellants, Explosives, Pyrotechnics 29 (2004), No. 4, pp. 209-215.

* cited by examiner

*Primary Examiner*—Steven J. Ganey
(74) *Attorney, Agent, or Firm*—David S. Kalmbaugh

(57) ABSTRACT

An embodiment of the invention includes an apparatus and a method for fire suppression including the utilization of an explosive composition layered between a fire suppressant panel such as, for example, a powder panel and another fixed structure such as, for example, a fuel tank dry bay wall. Upon impact or other means of detonation the explosive composition effects the rupture of a large number of frangible cells in the panel, dispersing the fire suppressant substance, thereby extinguishing or preventing fire.

20 Claims, 2 Drawing Sheets

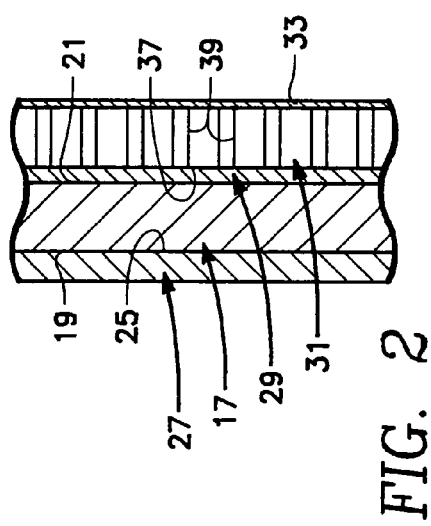
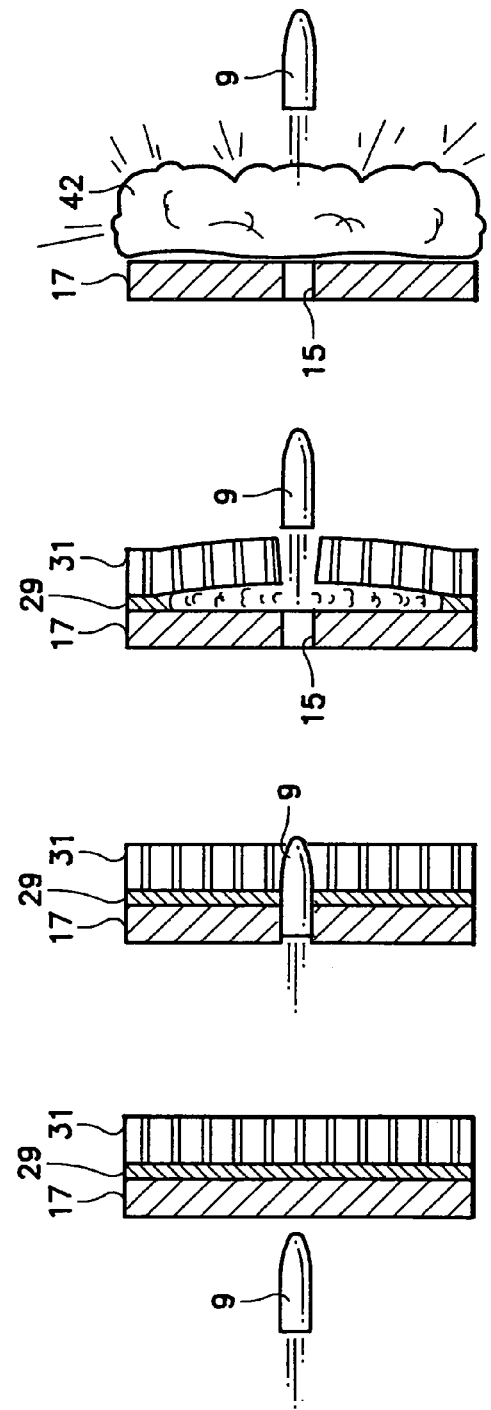

APPARATUS AND METHOD FOR FIRE SUPPRESSION

This application is a continuation-in-part of U.S. patent application Ser. No. 10/774,660, filed Feb. 3, 2004 now abandoned.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

This invention pertains to the field of fire suppression. More particularly, it pertains to the field of fire suppression panels.

BACKGROUND OF THE INVENTION

In any compartment, there is always the possibility of penetration from a projectile. When this occurs, such as in the case of a self-sealing fuel tank, some amount of fuel is lost through the penetration hole before the sealing material can seal the hole against further leakage. In other situations, the projectile can strike a surface in the penetrated compartment and the friction or flash of the strike can start a fire in the compartment. Passage of the projectile into the compartment therefore poses a significant fire risk.

In many vessels, such as in aircraft, compartments adjacent to fuel tanks may carry important steering, navigational, and control components that could be greatly damaged by a fire started when a bullet crashes through the walls of the fuel tank and into the adjacent compartment. In other situations, the mere entry of the projectile and striking of one of the components can cause a fire that can possibly do more damage than the initial penetration and collision with the equipment. The projectile, such as a bullet, is usually hot from friction generated in the penetration portion of the collision. This is even further of importance where the projectile contains an incendiary compound whose sole purpose is to start a fire inside the compartment that it has penetrated.

In aircraft, it has been the practice to cover the inside surface of compartments with panels containing a frangible honeycomb structure filled with a fire suppressant substance such as aluminum oxide. The operation of this fire mitigation technique begins when the projectile enters the compartment. Passage of the projectile through the wall causes collapse of the honeycombs (or cells) in the area of penetration and the honeycombs release their aluminum oxide powder that is carried by the turbulence produced by the projectile along its path of entry. The powder interferes with air reaching burnable substances (fuel) and acts to prevent a fire from starting as well as extinguishing any existing fire.

Often the size of the hole caused by the projectile is small, thereby breaking open only a small number of cells and releasing only a small amount of fire suppressant substance. This allows very little fire suppressant to be available to follow the leaked fuel or reach the flammable substances in the compartment. The slimmer the projectile and the higher its velocity, the less energy is lost in its penetration of the compartment and the smaller the hole in the panel.

It was thought that a layer of a small amount of the pyrotechnic compound BTATz (3,6-BIS(1H-1,2,3,4-TETRAZOL-5-YLAMINO)-1,2,4,5-TETRAZINE) could be placed on a supporting backing panel on which the powder panel was affixed, thereby exploding and dispersing the fire suppressant powder in case of projectile impact. (See Bennett, Aircraft Survivability, Fall 2002, p. 14-15). Subsequently it has been demonstrated that BTATz was unsuitable for exploding and dispersing the fire suppressant powder.

U.S. Pat. No. 6,657,059 for 3,6-BIS(1H-1,2,3,4-TETRAZOL-5-YLAMINO)-1,2,4,5-TETRAZINE (BTATz) or Salts thereof, which issued on Dec. 02, 2003 to Michael Hiskey et al. describes uses for BATz and its salts. Specifically, U.S. Pat. No. 6,657,059 describes BTATz as being a very energetic fuel containing no oxygen in its structure. This Patent further states that it has been found that a pressed pellet of 0.5 inch diameter BTATz does not detonate, and that BTATz has desirable properties for a propellant material making BTATz very useful as a solid rocket motor propellant allowing a rocket motor designer leeway. U.S. Pat. No. 6,657,059 includes seven examples describing BTATz compounds and properties. Example seven in U.S. Pat. No. 6,657,059 clearly states that BTATz has both a high burn rat and a low pressure component making a suitable candidate as a high performance propellant fuel.

An article entitled "Tetrazine Explosives" appearing in the Journal of Propellants, Explosives, Pyrotechnics 29 (2004), No. 4, pages 209-215 describes various properties of BTATz. In this article BTATz is described as being non-detonable even when boosted by another explosive (PBX 9501) as well as having a poorly defined sensitivity to impact.

BTATz burns rapidly releasing nitrogen gas. However, the reaction rate of BTATz is not fast enough to pressurize a panel and shatter a large area of the panel. The decomposition of BTATz emanates linearly from an impact point which assumes that the impact would set it off which is doubtful. Potentially all of the gas generated could escape through the impact point which would result in no further damage to the panel or only lead to limited tearing about the impact point.

When gases are not generated quickly enough they dissipate along the same non-obstructed path resulting in a less effective disruption of the panel. Therefore the process discussed by Bennett using BTATz would not result in more effective fire suppression.

Accordingly, there is a need for an efficient and effective means for increasing the amount of fire suppressant substance dispersed in a compartment upon the penetration of a projectile.

SUMMARY OF THE INVENTION

The present invention overcomes some of the disadvantages of the past including those mentioned above in that the present invention comprises an apparatus and method for fire suppression which uses a very powerful explosive such as CL20 (Hexanitroisowurtzitan) to shatter a fire suppression panel on a fuel tank in an aircraft, ship or other type of vehicle.

An embodiment of the invention includes an apparatus and a method for fire suppression including the utilization of a very powerful explosive composition, such as CL20, layered between a fire suppressant panel such as a powder panel and another fixed structure such as a fuel tank dry bay wall. Upon impact or other means of detonation the explosive composition shatters a large number of cells in the panel, very quickly dispersing the fire suppressant substance, thereby extinguishing or preventing a fire from occurring.

BRIEF DESCRIPTION OF THE DRAWINGS

FIG. 2 is a side view of the fire suppressant wall of an embodiment of the invention.

FIG. 3a is a side illustrative view of a projectile approaching the fire suppressant wall of an embodiment of the invention.

FIG. 3b is a side illustrative view of a projectile penetrating the fire suppressant wall of an embodiment of the invention.

FIG. 3c is a side illustrative view of a projectile passing through the fire suppressant wall of an embodiment of the invention.

FIG. 3d is a side illustrative view of a projectile exiting the fire suppressant wall of an embodiment of the invention, illustrating the release of the fire suppressant substance.

DESCRIPTION OF THE EMBODIMENTS

An embodiment of the invention relates to an apparatus and a method for fire suppression including the utilization of a powerful explosive composition, such as CL20, layered between a fire suppressant panel such as, for example, a powder panel and another fixed structure such as a fuel tank dry bay wall. Upon impact or other means of detonation the explosive composition causes the rupture of a large number of cells in the panel, dispersing the fire suppressant substance, thereby extinguishing or preventing fire.

Before explaining the disclosed embodiments of the invention in detail it is to be understood that the invention is not limited in its application to the details of the particular arrangement shown since the invention is capable of other embodiments. Also, the terminology used herein is for the purpose of description and not of limitation.

Figure 1:
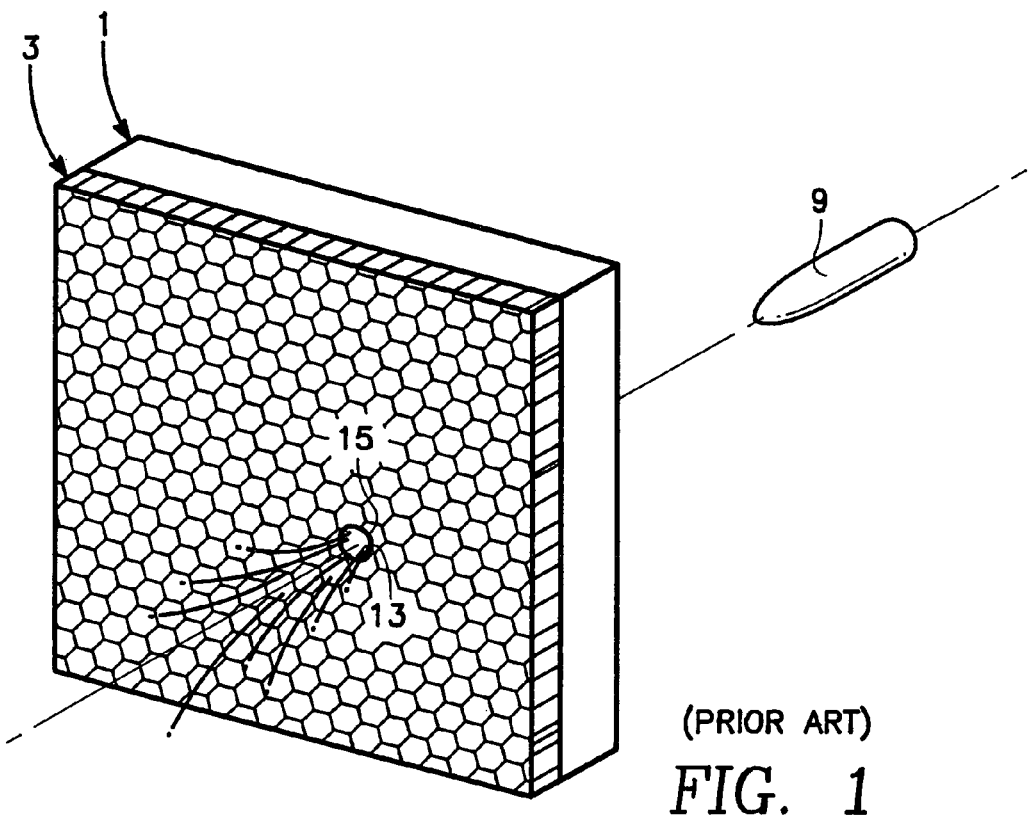
FIG. 1 is a perspective view of the prior art fire suppressant panel.
Figure 1A:
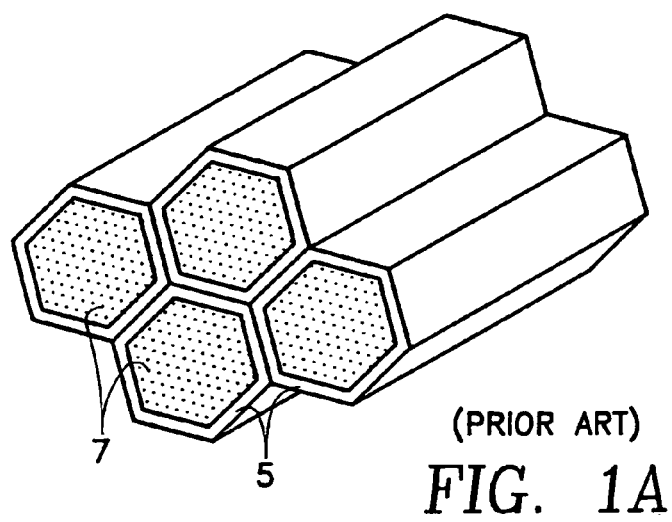
FIG. 1a is a close-up perspective view of the prior art panel cells shown in FIG. 1.

Referring to the drawings, wherein elements are identified by numbers and like elements are identified by like numbers throughout the figures, FIGS. 1 and 1a show prior art wherein a wall 1 such as a dry bay wall that is adjacent a fuel cell or an outside vehicle wall, is overlaid with a fire suppressant panel 3 including a layer of frangible honeycomb material 5 wherein each cell of the honeycomb material 5 is filled, either partially or fully, with a fire suppression substance 7, such as, for example, aluminum oxide, sodium bicarbonate, or potassium carbonate. It is noteworthy that the term "honeycomb" material includes, but is not limited to, cells having square, rectangular, hexagonal or cylindrical cells.

Upon penetration of wall 1 by an incoming projectile 9, such as, for example, a bullet, a hole 13 is formed through wall 1 and panel 3. A small amount 15 of fuel or other flammable material may follow projectile 9 through hole 13 until the fuel cell resealed itself. Alternatively, the fuel cell may fail to reseal itself and significant fuel leakage may occur. This fuel or other flammable material in the compartment may ignite, either from the hot exterior of bullet 9 or by a spark caused from the collision of bullet 9 with the solid surfaces of steering gear, pipes, tubes, electrical lines, etc. in the adjacent dry bay compartment into which bullet 9 penetrated. Only the fire suppressant substance 7 dispersed from the honeycomb panel 3 in the area of penetration of bullet 9 is released. This amount of fire suppressant substance 7 released is often insufficient to prevent or extinguish fire.

As shown in FIG. 2, an embodiment of the invention includes a fire suppressant wall that takes the place of the prior art structure shown in FIG. 1. In FIG. 2, a wall construction is illustrated including a first wall 17, sometimes referred to as a "backing board", having a first inner surface 19 and a first outer surface 21, wherein the first inner surface 19 is arranged for placement against the outer surface 25 of a typical dry bay wall 27. The opposite surface of dry bay wall 27 may be the outer surface of the vehicle or the outer surface of a fuel tank wall and is not shown in the figures.

First wall 17 acts as a backing board to effectively absorb and distribute much of the energy that would normally be directed at dry bay wall 27. It may be made of hard paper, hard plastic, or other materials known in the art that possess the requisite physical and chemical properties necessary to perform under the conditions prevalent in the specific bay compartment. In an embodiment of the invention a layer 29 of at least one explosive composition is located and fixed between the first outer surface 21 of first wall 17 and the second inner surface 37 of the second wall 31 (powder panel). The physical and chemical attributes of the at least one explosive composition of this embodiment include a very stable compound that is insensitive under ordinary handling and environmental circumstances. It is detonated under extreme duress, such as, for example, from impact, flame, spark and/or heat. The composition exhibits properties that include the ability to detonate instantly. Detonation velocities are in the range of about 1500 to about 9000 m/sec. In an embodiment of the invention, the explosive composition is CL20 (Hexanitrohexaazaisowurzitane). Numerous suitable secondary explosive compositions are available for use alone or in combination, such as, for example, CL20, RDX, HMX, tetryl, picric acid and their analogs, homologs, derivatives, and isomers, and are fully contemplated in various embodiments of this invention.

It has been found that CL20 when ignited shatters large areas of fire suppression panels releasing a large quantity of fire suppressant which completely extinguishes a fire. The explosive properties of CL20, including detonation velocities in the range of about 1500 to about 9000 meters per second, generate tremendous pressure on a fire suppressant panel, which is more than adequate to shatter the panel.

BTATz compounds, however, are non-detonable even when boosted by another explosive (PBX 9501) and also have a poorly defined sensitivity to impact. As previously discussed, U.S. Pat. No. 6,657,059 describes BTATz as being a very energetic fuel containing no oxygen in its structure. However, this patent also states that a pressed pellet of 0.5 inch diameter BTATz does not detonate. Further, the "Tetrazine Explosives" appearing in the Journal of Propellants, Explosives, Pyrotechnics 29 (2004), No. 4, pages 209-215 describes BTATz as being non-detonable even when boosted by another explosive (PBX 9501).

BTATz compounds also have a reaction rate which is not fast enough to adequately pressurize a fire suppressant panel and then shatter a large area of the panel. This results in insufficient quantities of fire suppressant materials being released to prevent or extinguish a fire. The decomposition of BTATz compounds emanate linearly from the impact point which assumes that impact from a projectile is capable of setting the BTATz compound off, which is doubtful. Potentially all of the gas generated by the BTATz compound could escape through the impact point which would result in no further damage to the fire suppressant panel or only lead to limited tearing of the fire suppressant panel about the impact point. A powerful explosive such as CL20 is a much more effective at shattering a panel than a gas generating material either alone or in combination with an initiating compound.

In another embodiment of the invention the layer 29 of an explosive composition is applied to the first wall 17 (backing board) by etching small recesses or channels (not shown) into which the explosive can be loaded. The explosive is confined in place by a suitable material such as, for example, an adhesive tape (not shown). The first wall may be an aluminum plate. This first wall 17 (backing board) is fixed between the first outer surface 21 of first wall 17 and the second inner surface 37 of the second wall 31 (fixed to the back side of the powder panel).

A second wall 31 (powder panel) is provided including a second inner surface 37 and a frangible second outer surface 33, spaced-apart from second inner surface 37, and a plurality of frangible enclosed cells or honeycombs 39 placed between the second outer surface 33 and the second inner surface 37. Each cell 39 is separated from its neighbor by a frangible material and each cell contains a cell-filling quantity of at least one fire suppressant substance. Numerous fire suppressant substances are available, such as, for example, aluminum oxide and antimony oxide, and are fully contemplated in various embodiments of this invention.

In an embodiment of the invention, as shown in FIGS. 3a, 3b, 3c and 3d, physical penetration by a projectile such as, for example, a bullet 9 through first wall 17 and on a path toward second wall 31 passes through layer 29 of explosive composition and causing layer 29 to detonate, rupturing the frangible cells of the second wall 31 and dispersing the fire suppressant substance 42. The fire suppressant substance 42 is spread through the compartment extinguishing fire or preventing fire by blanketing the compartment with fire suppressant substance.

Another embodiment of the invention includes a method for fire suppression including providing a first wall having a first inner surface and a first outer surface, providing a layer of at least one explosive composition of characteristics discussed above, and providing a second wall having a second inner surface and a frangible second outer surface spaced apart from the second inner surface and having a plurality of frangible cells placed between the surfaces and containing at least one fire suppressant substance. The method also includes fixedly coupling the layer of explosive composition between the first and second wall so that the detonation of the layer of explosive composition ruptures the frangible cells in the second wall, thereby dispersing the fire suppressant substance, preventing or extinguishing fire.

It is noteworthy that for illustrative purposes embodiments of the invention have been discussed wherein a projectile or other impact may occur in the direction from a fuel tank outward (wet to dry) but a person of skill in the art would recognize that a projectile or other impact may occur in the opposite direction (dry to wet) with embodiments of the invention utilized in the opposite direction.

It should be understood that the fire suppressant panel 3 should be mounted in one configuration, i.e. the powder side/panel facing the open area of dry bay wall 27.

EXPERIMENTAL RESULTS

Recesses 0.0625"wide×0.020" deep×6" long and space 0.5" apart were milled into 12" square aluminum plates (0.125" thick). The horizontal recesses were connected at their ends by vertical recesses of the same dimension. In some tests the vertical recesses were not continuous allowing for partial rupture of the panel. CL20 was manually pressed into the recesses. Approximately 0.5 g was CL20 was used for each plate. The CL20 was secured in place for handling by aluminum tape. 8" squares of commercially available powder panel were cut and fixed with epoxy to the aluminum plates containing the CL20 filled recesses. A 12" square of 0.25" thick rubber backing was applied to the side of the aluminum plate without the explosive to act as a fuel seal on a fuel cube.

The dry bay simulator is a rectangular steel box 1.5' W×2' H×4' L. The fuel cube is approximately 2'×2'×2'. A striker strip was used to ensure that the incendiary round functions. Two geometries were evaluated. "Dry to wet" indicates that the round impacted the powder panel and passed through the panel into the fuel cube. "Wet to dry" indicates that the round passed through the fuel cube and impacted the power panel on the rear side. (For test photos see Manchor, et al., Aircraft Survivability, Summer 2003, p. 40-41.)

The results of each shot are shown in the following table:

| Shot No. | Threat | Configuration | Comments |
|---|---|---|---|
| 4 | 12.7 mm × 108 API | No powder panel; Dry-to-wet | Sustained Fire |
| 7 | 12.7 mm × 108 API | Powder panel only; Dry-to-wet | Sustained Fire |
| 8 | 12.7 mm × 108 API | No powder panel; Dry-to-wet | Sustained Fire |
| 9 | 12.7 mm × 108 API | Powder panel with CL20; Dry-to-wet ⅔ panel ignited | CL20 Ignited; Fire Suppressed |
| 12 | 12.7 mm × 108 API | Powder panel with CL20; Dry-to-wet ⅓ panel ignited | CL20 Ignited; Fire Partially Suppressed* |
| 27 | 12.7 mm × 108 API | Powder panel only; Dry-to-wet | Sustained Fire |
| 29 | 12.7 mm × 108 API | Powder panel with CL20 (powder); Dry-to-wet | CL20 Ignited; Fire Suppressed |
| 33 | 12.7 mm × 108 API | Powder panel with CL20 (powder); Wet-to-dry | No Ignition: Fire Suppressed** |
| 34 | 12.7 mm × 108 API | Powder panel with CL20 (powder); Wet-to-dry | No Ignition: Fire Suppressed** |
| 35 | 12.7 mm × 108 API | Powder panel with CL20 (powder); Wet-to-dry | No Ignition: Fire Suppressed** |

Notes:
*Initial fire suppressed, but re-ignition occurred after powder subsided.
**Panel broken up by hydrodynamic ram (intense pressure shocks and waves generated by the impact of high-velocity or detonation of high explosive rounds in a liquid).
A.P.I. is an abbreviation for armor piercing incendiary.

The description above contains much specificity, this should not be construed as limiting the scope of the invention but as merely providing an illustration of one embodiment of the invention. Thus the scope of this invention should be determined by the appended claims and their legal equivalents.

What is claimed is:
1. A fire suppressant wall comprising:
(a) a first wall having an inner surface and an outer surface;
(b) a layer comprising an explosive composition, said explosive composition being insensitive to ordinary handling and environmental conditions but said explosive composition being detonated under extreme duress or impact, wherein said explosive composition comprises at least one of CL20, RDX, HMX, tetryl, and picric acid and their analogs, homologs, derivatives and isomers;

(c) said explosive composition having properties including the ability to detonate instantly with detonation velocities in a range of 1500 to 9000 meters per second;
(d) a second wall having an inner surface and a frangible outer surface spaced apart from the inner surface of said second wall, said second wall having a plurality of frangible cells placed between the inner surface of said second wall and the outer surface of said second wall, said cells having a fire suppressant substance contained therein: and
(e) said layer comprising said explosive composition being fixedly positioned between the outer surface of said first wall and the inner surface of said second wall, wherein a detonation of said layer of explosive composition produces said detonation velocity in the range of 1500 to 9000 meters per second which completely shatters said plurality of frangible cells in said second wall, thereby completely dispersing said fire suppressant substance to prevent or extinguish a fire.

2. The fire suppressant wall of claim 1 wherein said first wall comprises an aluminum plate.

3. The fire suppressant wall of claim 1 wherein said fire suppression substance comprises aluminum oxide, antimony oxide, sodium bicarbonate, or potassium carbonate.

4. The fire suppressant wall of claim 1 wherein said fire suppression substance comprises aluminum oxide powder.

5. The fire suppressant wall of claim 1 wherein said layer of explosive composition is pressed into recesses in said first wall, wherein each of said recesses is approximately 0.0625" wide by 0.020" deep by 6" long and spaced 0.5" apart from one another.

6. The fire suppressant wall of claim 1 wherein said layer of explosive composition comprises compressed pellets of 0.5 inch diameter.

7. A fire suppressant wall comprising:
(a) a first wall having an inner surface and an outer surface;
(b) a layer comprising an explosive composition, said explosive composition being insensitive to ordinary handling and environmental conditions but said explosive composition being detonated under extreme duress or impact, wherein said explosive composition comprises CL20 and its analogs, homologs, derivatives and isomers;
(c) said explosive composition having properties including the ability to detonate instantly with detonation velocities in a range of 1500 to 9000 meters per second;
(d) a second wall functioning as a fire suppressant panel to prevent or extinguish a fire when said explosive composition detonates, said second wall having an inner surface and a frangible outer surface spaced apart from the inner surface of said second wall, said second wall having a plurality of frangible cells placed between the inner surface of said second wall and the outer surface of said second wall, said cells having a fire suppressant substance contained therein, said second wall functioning as a fire suppressant panel to prevent or extinguish a fire when said explosive composition detonates: and
(e) said layer comprising said explosive composition being fixedly positioned between the outer surface of said first wall and the inner surface of said second wall, wherein a detonation of said layer of explosive composition produces said detonation velocity in the range of 1500 to 9000 meters per second which completely shatters said plurality of frangible cells in said second wall, thereby completely dispersing said fire suppressant substance to prevent or extinguish said fire.

8. The fire suppressant wall of claim 7 wherein said first wall comprises an aluminum plate.

9. The fire suppressant wall of claim 7 wherein said fire suppression substance comprises aluminum oxide, antimony oxide, sodium bicarbonate, or potassium carbonate.

10. The fire suppressant wall of claim 7 wherein said fire suppression substance comprises aluminum oxide powder.

11. The fire suppressant wall of claim 7 wherein said layer of explosive composition is pressed into recesses in said first wall, wherein each of said recesses is approximately 0.0625" wide by 0.020" deep by 6" long and spaced 0.5" apart from one another.

12. The fire suppressant wall of claim 7 wherein said layer of explosive composition comprises compressed pellets of 0.5 inch diameter.

13. A method for fire suppression comprising the steps of:
(a) providing a first wall having an inner surface and an outer surface;
(b) providing a layer comprising an explosive composition, said explosive composition being insensitive to ordinary handling and environmental conditions but said explosive composition being detonated under extreme duress or impact, said explosive composition having properties including the ability to detonate instantly producing detonation velocities in a range of 1500 to 9000 meters per second;
(c) providing a second wall having an inner surface and a frangible outer surface spaced apart from said the inner surface of second wall and having a plurality of frangible cells placed between the inner surface of said second wall and said the outer surface of said second wall, said cells having a fire suppressant substance contained therein; and,
(d) positioning said layer of said explosive composition fixedly between said first wall and said second wall, wherein said detonation of said layer of explosive composition produces said detonation velocities in the range of 1500 to 9000 meters per second shattering said plurality of frangible cells in said second wall, thereby completely dispersing said fire suppressant substance to prevent or extinguish a fire.

14. The method of claim 13 further comprising the step of directing a projectile into said layer of explosive composition to detonate instantly said explosive composition detonation velocities in the range of 1500 to 9000 meters per second.

15. The method of claim 13 further comprising the step of providing recesses in said first wall wherein said layer of explosive composition is pressed into the recesses in said first wall, wherein each of said recesses is approximately 0.0625" wide by 0.020" deep by 6" long and spaced 0.5" apart from one another.

16. The fire suppressant wall of claim 13 wherein said layer of explosive composition comprises compressed pellets of 0.5 inch diameter.

17. The method of claim 13 wherein said first wall comprises an aluminum plate.

18. The method of claim 13 wherein said explosive composition comprises at least one of CL20, RDX, HMX, tetryl, picric acid and their analogs, homologs, derivatives and isomers.

19. The method of claim 13 wherein said explosive composition comprises CL20 and its analogs, homologs, derivatives and isomers.

20. The method of claim 13 wherein said fire suppression substance comprises aluminum oxide, antimony oxide, sodium bicarbonate, or potassium carbonate.

* * * * *